US012604303B2

(12) United States Patent
Liu et al.

(10) Patent No.: US 12,604,303 B2
(45) Date of Patent: Apr. 14, 2026

(54) SIGNAL TRANSMISSION METHOD AND APPARATUS

(71) Applicant: HUAWEI TECHNOLOGIES CO., LTD., Shenzhen (CN)

(72) Inventors: Mengting Liu, Beijing (CN); Xin Gao, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 18/481,785

(22) Filed: Oct. 5, 2023

(65) Prior Publication Data

US 2024/0040554 A1 Feb. 1, 2024

Related U.S. Application Data

(63) Continuation of application No. PCT/CN2022/083766, filed on Mar. 29, 2022.

(30) Foreign Application Priority Data

Apr. 7, 2021 (CN) .......................... 202110374471.9

(51) Int. Cl.
| | |
|---|---|
| *H04W 72/04* | (2023.01) |
| *H04W 72/0453* | (2023.01) |
| *H04W 72/0457* | (2023.01) |

(52) U.S. Cl.
CPC ... *H04W 72/0453* (2013.01); *H04W 72/0457* (2023.01)

(58) Field of Classification Search
CPC ...................... H04W 72/0453; H04W 72/0457
See application file for complete search history.

(56) References Cited

U.S. PATENT DOCUMENTS

| | | | |
|---|---|---|---|
| 2011/0201370 A1* | 8/2011 | Lim ...................... | H04L 5/0098 |
| 2016/0128060 A1* | 5/2016 | Yazdi .................... | H04L 1/1812 |

(Continued)

FOREIGN PATENT DOCUMENTS

| | | |
|---|---|---|
| CN | 105589506 A | 5/2016 |
| WO | 2019061304 A1 | 4/2019 |

OTHER PUBLICATIONS

3GPP TS 38.211 V16.5.0 (Mar. 2021), 3rd Generation Partnership Project; Technical Specification Group Radio Access Network; NR; Physical channels and modulation (Release 16); 134 total pages.

(Continued)

*Primary Examiner* — Ronald B Abelson
(74) *Attorney, Agent, or Firm* — Rimon PC

(57) ABSTRACT

This application provides a signal transmission method and an apparatus. The method includes: generating m signals, where m is a positive integer greater than or equal to 2; and sending the m signals on m resources, where the m resources correspond to m frequency domain resources in frequency domain, the m resources correspond to m time elements in time domain, a first frequency domain resource used by a signal carried in an $i^{th}$ time element is distributed on at least two carrier components, a second frequency domain resource used by a signal carried in a $j^{th}$ time element is distributed on at least one carrier component, there is an overlapping part between the second frequency domain resource and the first frequency domain resource.

17 Claims, 7 Drawing Sheets

(56)                    References Cited

U.S. PATENT DOCUMENTS

| 2019/0109688 | A1 |   | 4/2019 | Kim et al. |   |
|---|---|---|---|---|---|
| 2019/0253282 | A1 |   | 8/2019 | Hadaschik et al. |   |
| 2022/0078798 | A1 | * | 3/2022 | Kumar | H04W 72/542 |
| 2025/0151056 | A1 | * | 5/2025 | Kim | H04L 5/1469 |

OTHER PUBLICATIONS

3GPP TS 38.101-1 V17.0.0 (Dec. 2020),3rd Generation Partnership Project; Technical Specification Group Radio Access Network; NR; User Equipment (UE) radio transmission and reception; Part 1: Range 1 Standalone (Release 17); 488 total pages.

* cited by examiner

SIGNAL TRANSMISSION METHOD AND APPARATUS

CROSS-REFERENCE TO RELATED APPLICATIONS

This application is a continuation of International Application No. PCT/CN2022/083766, filed on Mar. 29, 2022, which claims priority to Chinese Patent Application No. 202110374471.9, filed on Apr. 7, 2021. The disclosures of the aforementioned applications are hereby incorporated by reference in their entireties.

TECHNICAL FIELD

This application relates to the communication field, and in particular, to a signal transmission method and an apparatus.

BACKGROUND

With an increase of service types, different types of services have different requirements on quality of service (quality of service, QoS). Therefore, requirements on a bandwidth are also different. For example, for a positioning service, positioning precision depends on a bandwidth occupied by a positioning signal to a large extent. Qualitatively, a larger bandwidth indicates higher positioning precision. The following conclusion can be drawn after evaluation based on a simulation condition defined in a current 3GPP standard: A bandwidth of at least 200 MHz or above is needed to meet a centimeter-level positioning requirement. To implement centimeter-level positioning precision (for example, a positioning bandwidth is 200 MHz or above), a currently feasible solution is that a sending end sends a reference signal by using a carrier aggregation technology, to enable a receiving end to obtain a signal with a larger bandwidth. However, due to a hardware component, there is a random phase difference between reference signals sent by the sending end on different carrier components, and phases of the reference signals that are received by the receiving end on the different carrier components are inconsistent. Consequently, a valid large-bandwidth signal cannot be restored, and accuracy of location estimation is greatly affected.

SUMMARY

This application provides a signal transmission method and an apparatus, to implement high-precision positioning without greatly increasing costs, complexity, and power consumption of a sending end device.

According to a first aspect, this application provides a signal transmission method. The method includes: generating m signals, where m is a positive integer greater than or equal to 2; and sending the m signals on m resources, where the m resources correspond to m frequency domain resources in frequency domain, the m resources correspond to m time elements in time domain, a first frequency domain resource used by a signal carried in an $i^{th}$ time element is distributed on at least two carrier components, a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j.

It should be noted that signal transmission in this embodiment of this application includes receiving and sending of a signal. In this embodiment of this application, one of the m signals is, for example, a second signal. The second signal may include one signal, or may include a plurality of signals.

For example, the signal may be a reference signal or data or control information. This is not limited in this application.

In the foregoing manner, the first frequency domain resource is distributed on the at least two carrier components, and the second frequency domain resource partially overlaps with the first frequency domain resource. The overlapping part may be used to estimate a phase difference between signals from the first frequency domain resource and a second frequency domain. In this way, a receiving end can effectively restore a signal with a relatively large bandwidth. The bandwidth occupied by the signal may be greater than a bandwidth occupied by either of the two frequency domain resources. If the signal is used for positioning-related estimation and/or calculation, higher positioning precision is obtained compared with a positioning result that solely depends on the first frequency domain resource or the second frequency domain resource.

In a possible design, the first frequency domain resource includes k frequency domain resources. The k frequency domain resources separately belong to k bandwidth parts (bandwidth part, BWP). The k BWPs are distributed on the at least two carrier components, where k is a positive integer, and k is greater than or equal to 2.

Optionally, a frequency domain range of the first frequency domain resource may be greater than or equal to a frequency domain range of the k frequency domain resources. The frequency domain range of the k frequency domain resources may be less than or equal to a frequency domain range of the k BWPs. Each of the k BWPs is located on one carrier component. Different BWPs may be located on a same carrier component, or may be located on different carrier components.

It should be noted that, that the k BWPs are distributed on the at least two carrier components may be understood as that the k BWPs occupy all or some of the at least two carrier components. In other words, the k BWPs occupy all or some of the carrier components occupied by the first frequency domain resource. For example, if the first frequency domain resource is distributed on a first carrier component, a second carrier component, and a third carrier component, the k BWPs may be distributed on the first carrier component, the second carrier component, and the third carrier component. Alternatively, the k BWPs may be distributed on one or two of the first carrier component, the second carrier component, and the third carrier component. This is not limited in this application.

In the foregoing manner, because the k BWPs are distributed on the plurality of carrier components, the sending end device needs to send a signal on the k BWPs in a carrier aggregation manner.

In a possible design, the first frequency domain resource includes a first bandwidth part BWP. The first BWP is distributed on the at least two carrier components.

Optionally, a range of the first frequency domain resource may be greater than or equal to that of the first BWP.

It should be noted that, that the first BWP is distributed on the at least two carrier components may be understood as that the first BWP occupies all or some of the at least two carrier components. In other words, the first BWP occupies all or some of the carrier components occupied by the first frequency domain resource. For example, if the first frequency domain resource is distributed on a first carrier component, a second carrier component, and a third carrier component, the first BWP may be distributed on the first carrier component, the second carrier component, and the third carrier component. Alternatively, the first BWP may be distributed on two of the first carrier component, the second carrier component, and the third carrier component. This is not limited in this application.

It should be noted that, a definition of the first BWP is different from that of a current BWP. The first BWP is distributed on at least two carrier components, while the current BWP is distributed on a single carrier component.

In the foregoing manner, the sending end device only needs to support a carrier aggregation capability when sending a signal on the first BWP, and does not need to support the carrier aggregation capability when sending data, and also does not need to support the carrier aggregation capability when sending a signal on another BWP (for example, a BWP currently defined in a single carrier component). In this way, costs, complexity, and power consumption of a sending end can be reduced.

In a possible design, the method includes: receiving first information. The first information includes at least one of the following information: indication information of the m frequency domain resources, indication information of the m time elements, indication information of the first frequency domain resource, indication information of the k frequency domain resources, indication information of the k BWPs, indication information of the first BWP, and configuration information of the m signals. The k frequency domain resources are included in the first frequency domain resource. The k frequency domain resources separately belong to the k bandwidth parts (bandwidth part, BWP). The k BWPs are distributed on the at least two carrier components, where k is a positive integer, and k is greater than or equal to 2. The first BWP is a BWP distributed on the at least two carrier components.

In a possible design, the signal sent in the $i^{th}$ time element includes a first signal, and a frequency domain resource of the first signal is the first frequency domain resource.

In the foregoing manner, that the first signal corresponds to the first frequency domain resource may be understood as that a bandwidth occupied by the first signal does not exceed a range of the first frequency domain resource.

In a possible design, the first signal is generated based on the indication information of the first frequency domain resource. The indication information of the first frequency domain resource includes at least one of the following: the indication information of the first BWP, the indication information of the k BWPs, and a start frequency, a size, and a range that are of the first frequency domain resource.

In the foregoing manner, if the first signal is a reference signal, a sequence length of the first signal is related to a bandwidth size or range of the first BWP. To be specific, a larger bandwidth size of the first BWP may indicate a longer sequence length of the first signal. Alternatively, the sequence length of the first signal is related to whether the bandwidth range of the first BWP is at a low frequency or a high frequency.

In a possible design, the first signal includes q parts. The q parts correspond to the k frequency domain resources, where q is a positive integer.

In the foregoing manner, that the first signal includes q parts may be understood as that if the first signal is a reference signal, for example, a long sequence of the first signal may be truncated into q short sequences. Any one of the q short sequences may be sent on one or more of the k frequency domain resources. In this way, the sending end only needs to generate a single long sequence at a time, and then separately sends the long sequence on different frequency domain resources, and does not need to generate a short sequence for a plurality of times, so that operation complexity of the sending end can be reduced, and signaling overheads of the first information can be reduced.

In a possible design, a value of q may be the same as or different from a value of k. This is not limited in this application.

In a possible design, the signal sent in the $i^{th}$ time element includes p sub-signals. The p sub-signals correspond to the k frequency domain resources, where p is a positive integer.

In a possible design, the p sub-signals are generated based on the indication information of the k frequency domain resources. The indication information of the k frequency domain resources includes at least one of the following: the indication information of the k BWPs, and start frequencies, sizes, and ranges that are of the k frequency domain resources.

In the foregoing manner, the p sub-signals are independently generated short sequences. Each sub-signal may be sent on one or more of the k frequency domain resources. One of the p sub-signals is used as an example. If the sub-signal is a reference signal, a sequence length of the sub-signal is related to a bandwidth size or range of an occupied frequency domain resource. To be specific, a larger bandwidth size of the occupied frequency domain resource may indicate a longer sequence length of the sub-signal. Alternatively, the sequence length of the sub-signal is related to whether the bandwidth range of the occupied frequency domain resource is at a low frequency or a high frequency. Compared with a long sequence truncation manner, the foregoing manner has less impact on the current standard protocol. In addition, a generation rule may be more flexible. In a possible design, a value of p may be the same as or different from a value of k. This is not limited in this application.

In a possible design, a bandwidth of the first frequency domain resource does not exceed a first preset value.

Optionally, the first preset value may be a bandwidth of a single carrier component or another value. This is not limited in this application.

In the foregoing manner, a bandwidth size of the first frequency domain resource is limited, so that it can be ensured that the sending end device does not greatly increase costs, complexity, and power consumption of the device.

In a possible design, the $i^{th}$ time element is adjacent to the $j^{th}$ time element.

In the foregoing manner, because the time elements for sending are adjacent, a channel change corresponding to the $i^{th}$ time element and the $j^{th}$ time element is relatively small, and a more accurate phase estimation result can be obtained, thereby improving positioning precision.

Optionally, the $i^{th}$ time element is not adjacent to the $j^{th}$ time element.

In the foregoing manner, if the $i^{th}$ time element is not adjacent to the $j^{th}$ time element, flexibility of the sending end may be increased. For example, another signal may be sent at any moment between the $i^{th}$ time element and the $j^{th}$ time element.

In a possible design, the carrier component is a segment of spectrum that is consecutive in frequency, and the at least two carrier components are consecutive in frequency domain.

In a possible design, the at least two carrier components are consecutive in frequency domain, and a guard band between any two adjacent carrier components of the at least two carrier components is greater than or equal to 0 Hz.

In a possible design, the m signals are positioning reference signals.

It should be understood that, that the m signals are positioning reference signals may be understood as that each of the m signals is a positioning reference signal.

It should be noted that there may be different types of signals in the m signals. To be specific, some of the m signals may be positioning reference signals, some of the m signals may be data, and some of the m signals may be control information. This is not limited in this application.

Optionally, each of the m signals may be one of the following signals: a physical random access channel (physical random access channel) signal, a synchronization and physical broadcast channel block (synchronization signal and physical broadcast channel block, SSB), or the like. This is not limited in this application.

In a possible design, the signal sent in the $i^{th}$ time element includes at least one phase tracking reference signal. A frequency domain resource of the phase tracking reference signal is located at the overlapping part between the first frequency domain resource and the second frequency domain resource.

In the foregoing manner, when the phase tracking reference signal is used for positioning, a more accurate phase estimation result can be obtained.

In a possible design, a value of q may be the same as or different from a value of k. This is not limited in this application.

In a possible design, the signal sent in the $i^{th}$ time element includes p sub-signals. The p sub-signals correspond to the k frequency domain resources, where p is a positive integer.

In a possible design, the p sub-signals are generated based on the indication information of the k frequency domain resources. The indication information of the k frequency domain resources includes at least one of the following: the indication information of the k BWPs, and start frequencies, sizes, and ranges that are of the k frequency domain resources.

In the foregoing manner, the p sub-signals are independently generated short sequences. Each sub-signal may be sent on one or more of the k frequency domain resources. One of the p sub-signals is used as an example. If the sub-signal is a reference signal, a sequence length of the sub-signal is related to a bandwidth size or range of an occupied frequency domain resource. To be specific, a larger bandwidth size of the occupied frequency domain resource may indicate a longer sequence length of the sub-signal. Alternatively, the sequence length of the sub-signal is related to whether the bandwidth range of the occupied frequency domain resource is at a low frequency or a high frequency. Compared with a long sequence truncation manner, the foregoing manner has less impact on the current standard protocol. In addition, a generation rule may be more flexible. In a possible design, a value of p may be the same as or different from a value of k. This is not limited in this application.

In a possible design, a bandwidth of the first frequency domain resource does not exceed a first preset value.

Optionally, the first preset value may be a bandwidth of a single carrier component or another value. This is not limited in this application.

In the foregoing manner, a bandwidth size of the first frequency domain resource is limited, so that it can be ensured that the sending end device does not greatly increase costs, complexity, and power consumption of the device.

In a possible design, the $i^{th}$ time element is adjacent to the $j^{th}$ time element.

In the foregoing manner, because the time elements for sending are adjacent, a channel change corresponding to the $i^{th}$ time element and the $j^{th}$ time element is relatively small, and a more accurate phase estimation result can be obtained, thereby improving positioning precision.

Optionally, the $i^{th}$ time element is not adjacent to the $j^{th}$ time element.

In the foregoing manner, if the $i^{th}$ time element is not adjacent to the $j^{th}$ time element, flexibility of the sending end may be increased. For example, another signal may be sent at any moment between the $i^{th}$ time element and the $j^{th}$ time element.

In a possible design, the carrier component is a segment of spectrum that is consecutive in frequency, and the at least two carrier components are consecutive in frequency domain.

In a possible design, the at least two carrier components are consecutive in frequency domain, and a guard band between any two adjacent carrier components of the at least two carrier components is greater than or equal to 0 Hz.

In a possible design, the m signals are positioning reference signals.

It should be understood that, that the m signals are positioning reference signals may be understood as that each of the m signals is a positioning reference signal.

It should be noted that there may be different types of signals in the m signals. To be specific, some of the m signals may be positioning reference signals, some of the m signals may be data, and some of the m signals may be control information. This is not limited in this application.

Optionally, each of the m signals may be one of the following signals: a physical random access channel (physical random access channel) signal, a synchronization and physical broadcast channel block (synchronization signal and physical broadcast channel block, SSB), or the like. This is not limited in this application.

In a possible design, the signal sent in the $i^{th}$ time element includes at least one phase tracking reference signal. A frequency domain resource of the phase tracking reference signal is located at the overlapping part between the first frequency domain resource and the second frequency domain resource.

In the foregoing manner, when the phase tracking reference signal is used for positioning, a more accurate phase estimation result can be obtained.

According to a third aspect, this application provides a signal transmission method. The method includes: generating m signals, where m is a positive integer greater than or equal to 2; and sending the m signals on m resources, where the m resources correspond to m frequency domain resources in frequency domain, the m resources correspond to m time elements in time domain, a first signal and a second signal in the m signals are carried in different time elements, a frequency domain resource on which the first signal is carried partially overlaps with a frequency domain resource on which the second signal is carried, and the frequency domain resource on which the first signal is carried is distributed on at least two carrier components.

According to a fourth aspect, a communication apparatus is provided. For beneficial effects, refer to the descriptions in the first aspect. Details are not described herein again. The communication apparatus has a function of implementing the behavior in the method example in the first aspect. The function may be implemented by hardware, or may be implemented by hardware executing corresponding software. The hardware or the software includes one or more modules corresponding to the function. In a possible design, the communication apparatus includes: a processing module, configured to generate m signals, where m is a positive integer greater than or equal to 2; and a transceiver module, configured to send the m signals on m resources, where the m resources correspond to m frequency domain resources in frequency domain, the m resources correspond to m time elements in time domain, a first frequency domain resource used by a signal carried in an $i^{th}$ time element is distributed on at least two carrier components, a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j. These modules may perform corresponding functions in the method example in the first aspect. For details, refer to the detailed descriptions in the method example. Details are not described herein again.

According to a fifth aspect, a communication apparatus is provided. For beneficial effects, refer to the descriptions in a second aspect. Details are not described herein again. The communication apparatus has a function of implementing the behavior in the method example in the second aspect. The function may be implemented by hardware, or may be implemented by hardware executing corresponding software. The hardware or the software includes one or more modules corresponding to the function. In a possible design, the communication apparatus includes: a transceiver module, configured to receive m signals, where m is a positive integer greater than or equal to 2, the m signals are located on m resources, the m resources correspond to m frequency domain resources in frequency domain, the m resources correspond to m time elements in time domain, a first frequency domain resource used by a signal carried in an $i^{th}$ time element is distributed on at least two carrier components, a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j. These modules may perform corresponding functions in the method example in the second aspect. For details, refer to the detailed descriptions in the method example. Details are not described herein again.

According to a sixth aspect, a communication apparatus is provided. The communication apparatus may be the terminal device in the foregoing method embodiments, or may be a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the terminal device in the foregoing method embodiments.

According to a seventh aspect, a communication apparatus is provided. The communication apparatus may be the network device in the foregoing method embodiments, or may be a chip disposed in the network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the network device in the foregoing method embodiments.

According to an eighth aspect, a computer program product is provided. The computer program product includes computer program code. When the computer program code is run, the method performed by the terminal device in the foregoing aspects is performed.

According to a ninth aspect, a computer program product is provided. The computer program product includes computer program code. When the computer program code is run, the method performed by the network device in the foregoing aspects is performed.

According to a tenth aspect, this application provides a chip system. The chip system includes a processor, configured to implement the functions of the terminal device in the methods in the foregoing aspects. In a possible design, the chip system further includes a memory, configured to store program instructions and/or data. The chip system may include a chip, or may include a chip and another discrete device.

According to an eleventh aspect, this application provides a chip system. The chip system includes a processor, configured to implement the functions of the network device in the methods in the foregoing aspects. In a possible design, the chip system further includes a memory, configured to store program instructions and/or data. The chip system may include a chip, or may include a chip and another discrete device.

According to a twelfth aspect, this application provides a computer-readable storage medium. The computer-readable storage medium stores a computer program. When the computer program is run, the method performed by the terminal device in the foregoing aspects is implemented.

According to a thirteenth aspect, this application provides a computer-readable storage medium. The computer-readable storage medium stores a computer program. When the computer program is run, the method performed by the network device in the foregoing aspects is implemented.

DESCRIPTION OF EMBODIMENTS

Figure 1:
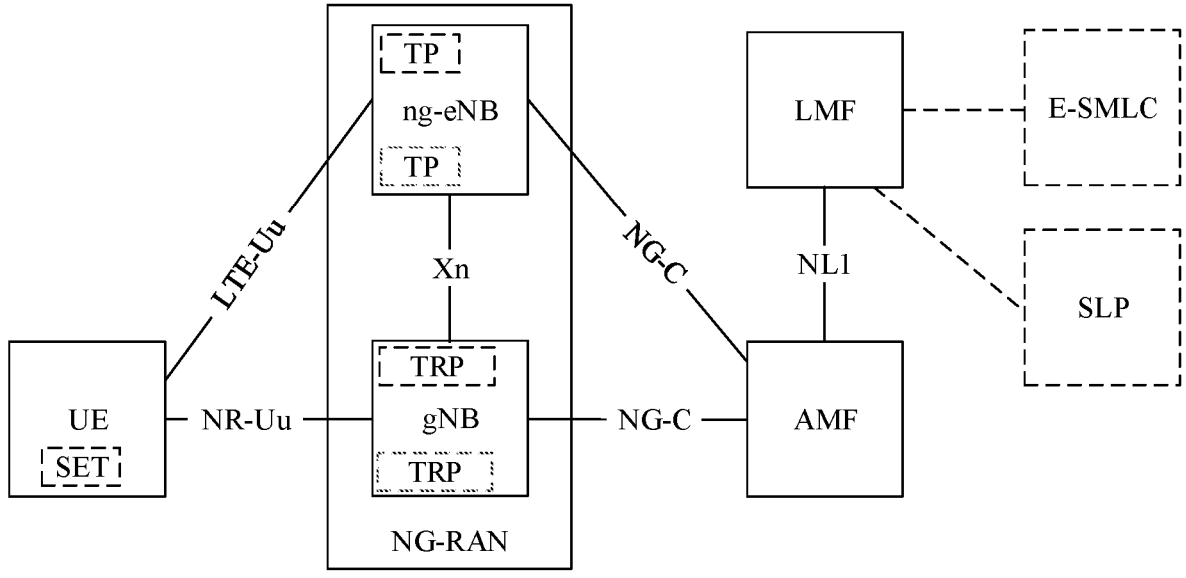
FIG. 1 is a diagram of an example of an application scenario applicable to an embodiment of this application.

The following describes technical solutions of this application with reference to accompanying drawings. It is clear that the described embodiments are merely some rather than all of embodiments of the present invention. All other embodiments obtained by a person of ordinary skill in the art based on embodiments of the present invention without creative efforts shall fall within the protection scope of the present invention.

It should be understood that division of manners, cases, and types in embodiments of this application are only for ease of description, but should not constitute a special limitation, and features in various manners, types, and cases may be combined when there is no contradiction.

It should be further understood that the terms "first", "second", and "third" in embodiments of this application are merely used for distinguishing, and should not be construed as any limitation on this application.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5th generation (5th generation, 5G) system, a new radio (new radio, NR) system, or a future 6th generation (6th generation, 6G) system.

The terminal device in embodiments of this application may also be referred to as user equipment (user equipment, UE), an access terminal, a terminal device unit (subscriber unit), a terminal device station, a mobile station, a mobile station (mobile station, MS), a remote station, a remote terminal, a mobile device, a user terminal, a terminal (terminal), a wireless communication device, a terminal device agent, or a terminal device apparatus. The terminal device may include various handheld devices, vehicle-mounted devices, wearable devices, or computing devices that have a wireless communication function, or other processing devices connected to a wireless modem. The terminal device may further include a subscriber unit, a cellular phone (cellular phone), a smartphone (smartphone), a wireless data card, a personal digital assistant (personal digital assistant, PDA) computer, a tablet computer, a wireless modem (modem), a handheld device (handset), a laptop computer (laptop computer), a machine type communication (machine type communication, MTC) terminal, or a station (station, ST) in a wireless local area network (wireless local area network, WLAN). The terminal device may be a cellular phone, a cordless phone, a session initiation protocol (session initiation protocol, SIP) phone, a wireless local loop (wireless local loop, WLL) station, or a next-generation communication system, for example, a terminal device in a 5G network, or a terminal device in a future evolved PLMN network.

The network device in embodiments of this application may be a device configured to communicate with the terminal device. The network device may be an evolved NodeB (evolved nodeB, eNB, or eNodeB) in an LTE system, or may be a wireless controller in a cloud radio access network (cloud radio access network, CRAN) scenario. Alternatively, the network device may be a relay node, an access point, a vehicle-mounted device, a wearable device, a network device in a 5G network, a network device in a future evolved PLMN network, or the like. This is not limited in embodiments of this application.

For ease of understanding, the following briefly describes basic concepts in embodiments of this application.

Time element (time element, TE): In embodiments of this application, a time element is a length of a period of time. For example, the time element may be a subframe (subframe), a slot (slot), a mini-slot (mini-slot), or a symbol. The time element may be alternatively a plurality of subframes, a plurality of slots, a plurality of mini-slots, a plurality of symbols, or the like. Further, the time element may be a time element used to schedule a transport block in a communication system. For example, the time element may be a transmission time interval (transmission time interval, TTI).

Positioning reference signal (positioning reference signal, PRS): A positioning reference signal includes a downlink positioning reference signal (downlink positioning reference signal, DL-PRS) and an uplink positioning reference signal (uplink positioning reference signal, UL-PRS). The downlink positioning reference signal DL-PRS is generally referred to as a positioning reference signal PRS for short. The uplink positioning reference signal UL-PRS includes a sounding reference signal (sounding reference signal, SRS, used in 3GPP R15 and earlier versions) used for MIMO and a positioning sounding reference signal (positioning sounding reference signal, pos-SRS, or SRS).

FIG. 1 is a diagram of an application scenario applicable to an embodiment of this application, and shows a service-based positioning service network architecture.

In a positioning architecture based on the 5G core network, functions of functional entities are as follows:

A location management function (location management function, LMF) is responsible for supporting different types of location services related to target UE, including positioning the UE and transmitting assistance data to the UE. The LMF may perform the following information exchange with a 4G base station (for example, an ng-eNB) or a 5G base station (for example, a gNB) and the UE: information exchange performed with the ng-eNB/gNB through a new radio NR positioning protocol A (which may be referred to as NRPPa) message, for example, obtaining of positioning reference signal (positioning reference signal, PRS) configuration information, sounding reference signal (sounding reference signal, SRS) configuration information, cell timing, or cell location information; or transmission of UE capability information, transmission of assistance information, transmission of measurement information, or the like performed with the UE through an LTE positioning protocol (LTE positioning protocol, LPP) message.

An access and mobility management function (access and mobility management function, AMF) may receive a location service request related to the target UE from a 5G core network (5G core network, 5GC) location services (location server, LCS) entity. Alternatively, the AMF itself may start specific location services on behalf of the target UE, and forward a location service request to the LMF. If location calculation is completed on the UE side, after obtaining location information reported by the UE, the AMF returns related location information to the 5GC LCS entity.

The UE can measure downlink signals from a next generation radio access network (next generation radio access network, NG-RAN) and another source to support positioning; and the gNB/ng-eNB may provide configuration information for the target UE, and convey the configuration information to the LMF.

In addition, in FIG. 1, NL1 represents an NL1 interface, NG-C represents an NG-C interface, LTE-Uu represents an LTE-Uu interface, NR-Uu represents an NR-Uu interface, and Xn represents a connection between the ng-eNB and the gNB.

In this application, a 5G positioning scenario is used as an example to describe a data transmission method. It should be understood that the data transmission method in this application may be further applied to another scenario in which data needs to be transmitted with a large bandwidth. This is not limited in this application.

In the following, the signal transmission method in this embodiment of this application is described in detail with reference to FIG. 2 to FIG. 6.

Figure 2:
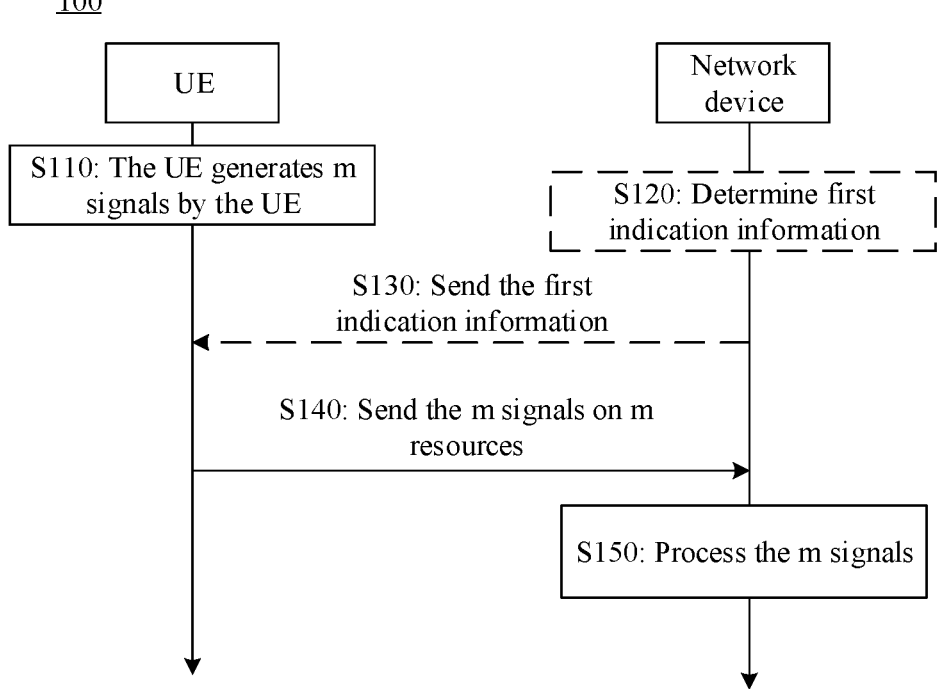
FIG. 2 is a schematic flowchart of a signal transmission method 100 according to an embodiment of this application.

FIG. 2 is a schematic flowchart of a signal transmission method 100 according to an embodiment of this application. In FIG. 2, an uplink positioning method is used as an example for description. To be specific, a terminal device (a sending end) sends an uplink reference signal, and a network device (a receiving end) receives the reference signal and uses the reference signal for positioning. The same method is also applicable to a downlink positioning method, a joint uplink and downlink positioning method, and the like. This is not limited in this application.

As shown in FIG. 2, in S110, the terminal device generates m signals, where m is a positive integer, and m is greater than or equal to 2.

Specifically, the m signals may be positioning reference signals SRSs, or may be other reference signals, or may be physical random access channel (physical random access channel) signals, or may be data, or may be control information. Content of the m signals is not limited in this application. In this application, an example in which the terminal device sends the SRSs is used for description.

In a possible implementation, in S120, the network device determines first information. The first information includes at least one of the following information: indication information of m frequency domain resources, indication information of m time elements, indication information of a first BWP, configuration information of the m signals, indication information of a first frequency domain resource, indication information of k frequency domain resources, and indication information of k bandwidth parts BWPs, where k is a positive integer.

The indication information of the m frequency domain resources includes at least one of the following: a start frequency, a size, and a range that are of each of the m frequency domain resources.

The indication information of the m time elements includes at least one of the following: a start time, a size, and a range that are of each of the m time elements.

The indication information of the k BWPs includes at least one of the following: identifiers, frequency domain start locations, bandwidths, subcarrier component spacings, and cyclic prefix information of the k BWPs.

The indication information of the first BWP includes at least one of the following: an identifier, a frequency domain start location, a bandwidth, a subcarrier component spacing, and cyclic prefix information of the first BWP.

The indication information of the first frequency domain resource includes at least one of the following: the indication information of the first BWP, the indication information of the k BWPs, and a start frequency, a size, and a range that are of the first frequency domain resource.

The indication information of the k frequency domain resources includes at least one of the following: the indication information of the k BWPs, and start frequencies, sizes, and ranges that are of the k frequency domain resources.

The configuration information of the m signals includes at least one of the following: scrambling code information, location information, cycle information, interval information, frequency hopping information, density information, reserved time information, tuning time information, and non-simultaneous sending information.

The scrambling code information includes at least one of the following: a scrambling code range and a scrambling code value set of the m signals.

Figure 3:
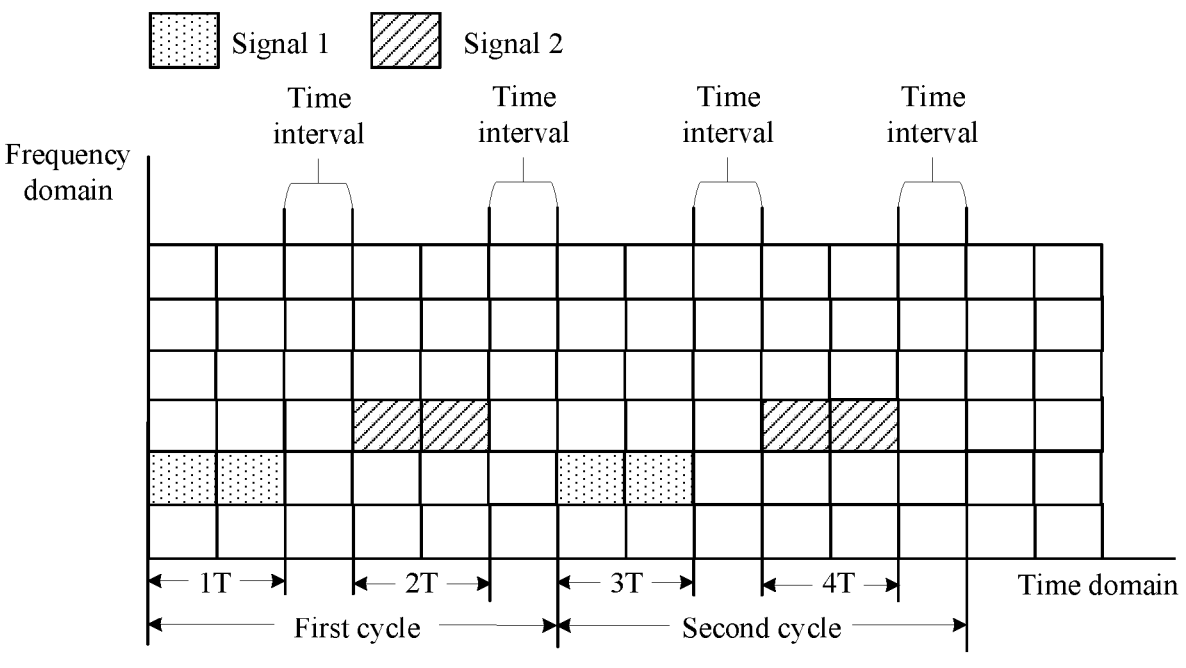
FIG. 3 is a schematic diagram of an example of a signal transmission method applied to an embodiment of this application.

The location information is location information of a time domain resource occupied by the m signals, and may be understood with reference to FIG. 3, for example, a start location and an end location of 1T, or a start location of 1T and a time domain length of IT.

The cycle information is a sending cycle of the m signals, and may be understood with reference to FIG. 3, for example, a first cycle (including 1T, 2T, and two time intervals). Alternatively, the cycle information may be understood as a cycle of time domain resources of the m signals.

The interval information is a sending time interval of signals corresponding to two adjacent time elements in the m signals, and may be understood with reference to FIG. 3, for example, a time interval between 1T for sending a signal 1 and 2T for sending a signal 2.

The density information is a quantity of times of sending the m signals within a specific time range.

The reserved time information is a time length that needs to be reserved before the m signals are sent, or a time length that needs to be reserved after the m signals are sent, or a time length that needs to be reserved between two adjacent time elements.

The tuning time information is a time occupied by radio frequency retuning (radio frequency retuning, RF retuning).

The non-simultaneous sending information indicates that when sending the m signals, the terminal device does not support sending of information other than the m signals.

The frequency hopping information includes one or more of the following information:

whether sending of the m signals in a frequency hopping manner is supported, namely, whether two adjacent signals in the m signals are sent in a frequency hopping manner;

a hop count of the m sent signals within a specific time, where the hop count may be understood as that, if two adjacent signals in the m signals are used as an example, and the two adjacent signals are transmitted in a frequency hopping manner, a hop count between the two signals is 1;

a quantity of resource blocks RBs occupied by frequency hopping between two adjacent signals in the m sent signals, where the quantity may also be understood as a quantity of RBs between a frequency domain start location of a next signal (a next-hop signal) and a frequency domain start location of a previous signal (a previous-hop signal) in the two adjacent signals (two adjacent hop signals);

a resource width corresponding to frequency hopping between two adjacent signals in the m sent signals, where the resource width may also be understood as a size (width) of a frequency domain resource between a frequency domain start location of a next signal (a next-hop signal) and a frequency domain start location of a previous signal (a previous-hop signal) in two adjacent signals (two adjacent hop signals);

a frequency hopping offset between two adjacent signals in the m sent signals, where in an embodiment, the frequency hopping offset may be an offset of a frequency domain start location of a next signal (a next-hop signal) in the two adjacent signals (two adjacent hop signals) relative to a predetermined frequency domain location, and the predetermined frequency domain location may be determined based on the quantity of the resource blocks RB s occupied by frequency hopping or the resource width corresponding to frequency hopping in the foregoing descriptions, or may be a frequency domain start location of a previous signal, or may be a specified frequency domain reference location;

a frequency domain resource range occupied by the m signals sent in a frequency hopping manner; and information about a subcarrier component spacing on which two adjacent signals in the m sent signals are located.

The network device may be an LMF or a base station. The network device configures and activates the m frequency domain resources. When one of the m frequency domain resources is distributed on a plurality of BWPs, and the plurality of BWPs are consecutive in frequency domain, the network device needs to associate the plurality of BWP resources together, and simultaneously activate or deactivate the plurality of BWP resources.

In a possible implementation, in S130, the network device sends the first information to the terminal device, and the terminal device receives the first information.

In S140, the terminal device sends the m signals on m resources.

Specifically, the terminal device sends the m signals on m resources, where the m resources correspond to m frequency domain resources in frequency domain, the m resources correspond to m time elements in time domain, a first frequency domain resource used by a signal carried in an $i^{th}$ time element is distributed on at least two carrier components, a second frequency domain resource used by a signal carried in a $i^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j.

It should be understood that, in this embodiment of this application, the terminal device may send the m signals on the m frequency domain resources and the m time elements in a frequency hopping manner. This is not limited in this application.

It should be noted that signal transmission in this embodiment of this application includes receiving and sending of a signal.

For example, the signal may be a reference signal, data, or control information. This is not limited in this application.

In the foregoing manner, the first frequency domain resource is distributed on the at least two carrier components, and the second frequency domain resource partially overlaps with the first frequency domain resource. The overlapping part may be used to estimate a phase difference between signals from the first frequency domain resource and a second frequency domain. In this way, a receiving end can effectively restore a signal with a relatively large bandwidth. The bandwidth occupied by the signal may be greater than a bandwidth occupied by either of the two frequency domain resources. If the signal is used for positioning-related estimation and/or calculation, higher positioning precision is obtained compared with a positioning result that solely depends on the first frequency domain resource or the second frequency domain resource.

In a possible implementation, the first frequency domain resource includes k frequency domain resources. The k frequency domain resources separately belong to k bandwidth parts BWPs. The k BWPs are distributed on at least two carrier components, where k is a positive integer, and k is greater than or equal to 2.

If the m signals are SRS sequences, a length of each SRS sequence is related to a bandwidth size of an occupied frequency domain resource.

Optionally, a frequency domain range of the first frequency domain resource may be greater than or equal to a frequency domain range of the k frequency domain resources. The frequency domain range of the k frequency domain resources may be less than or equal to a frequency domain range of the k BWPs. Each of the k BWPs is located on one carrier component. Different BWPs may be located on a same carrier component, or may be located on different carrier components.

It should be noted that, that the k BWPs are distributed on at least two carrier components may be understood as that the k BWPs occupy all or some of the at least two carrier components. In other words, the k BWPs occupy all or some of the carrier components occupied by the first frequency domain resource. For example, if the first frequency domain resource is distributed on a first carrier component, a second carrier component, and a third carrier component, the k BWPs may be distributed on the first carrier component, the second carrier component, and the third carrier component. Alternatively, the k BWPs may be distributed on one or two of the first carrier component, the second carrier component, and the third carrier component. This is not limited in this application.

In the foregoing manner, because the k BWPs are distributed on the plurality of carrier components, the sending end device needs to send a signal on the k BWPs in a carrier aggregation manner.

In a possible implementation, the first frequency domain resource includes a first BWP. The first BWP is distributed on the at least two carrier components.

Optionally, a range of the first frequency domain resource may be greater than or equal to that of the first BWP.

It should be noted that, that the first BWP is distributed on the at least two carrier components may be understood as that the first BWP occupies all or some of the at least two carrier components. In other words, the first BWP occupies all or some of the carrier components occupied by the first frequency domain resource. For example, if the first frequency domain resource is distributed on a first carrier component, a second carrier component, and a third carrier component, the first BWP may be distributed on the first carrier component, the second carrier component, and the third carrier component. Alternatively, the first BWP may be distributed on two of the first carrier component, the second carrier component, and the third carrier component. This is not limited in this application.

It should be noted that, a definition of the first BWP in the foregoing manner is different from that of a current BWP. The first BWP in the foregoing manner is distributed on at least two carrier components, while the current BWP is distributed on a single carrier component.

In the foregoing manner, the sending end device only needs to support a carrier aggregation capability when sending a signal on the first BWP, and does not need to support the carrier aggregation capability when sending a signal on another BWP (for example, a BWP currently defined in a single carrier component). In this way, costs, complexity, and power consumption of a sending end can be reduced.

In a possible implementation, any one of the m time elements may include an actual signal sending time and a re-tuning time (re-tuning time) of a phase-locked loop. In addition, any two time elements for sending in the m time elements may be spaced by several symbols or slots.

In a possible implementation, the signal sent in the $i^{th}$ time element includes a first signal, and a frequency domain resource of the first signal is the first frequency domain resource.

In the foregoing manner, that the first signal corresponds to the first frequency domain resource may be understood as that a bandwidth occupied by the first signal does not exceed a range of the first frequency domain resource.

In a possible implementation, the first signal is generated based on the indication information of the first frequency domain resource. The indication information of the first frequency domain resource includes at least one of the following: the indication information of the first BWP, the indication information of the k BWPs, and a start frequency, a size, and a range that are of the first frequency domain resource.

In the foregoing manner, for example, if the first signal is a reference signal, a sequence length of the first signal is related to a bandwidth size or range of the first BWP. To be specific, a larger bandwidth size of the first BWP may indicate a longer sequence length of the first signal. Alternatively, the sequence length of the first signal is related to whether the bandwidth range of the first BWP is at a low frequency or a high frequency.

In a possible implementation, the first signal includes q parts. The q parts correspond to the k frequency domain resources, where q is a positive integer.

In the foregoing manner, that the first signal includes q parts may be understood as that if the first signal is a reference signal, for example, a long sequence of the first signal may be truncated into q short sequences. Any one of the q short sequences may be sent on one or more of the k frequency domain resources. In this way, the sending end only needs to generate a single long sequence at a time, and then separately sends the long sequence on different frequency domain resources, and does not need to generate a short sequence for a plurality of times, so that operation complexity of the sending end can be reduced, and signaling overheads of the first information can be reduced.

In a possible implementation, a value of q may be the same as or different from a value of k. This is not limited in this application.

If a value of q is the same as a value of k, for example, when q=2 and k=2, the first frequency domain resource is located on a BWP #1 (5 MHz) and a BWP #2 (95 MHz), the first signal is generated based on the indication information of the first frequency domain resource, and the first signal (a long sequence) may be truncated into two parts (two short sequences), for example, S1 and S2, where S1 and S2 respectively correspond to the BWP #1 and the BWP #2. The terminal device sends S1 on the BWP #1 and sends S2 on the BWP #2. If a value of q is different from a value of k, for example, when q=3 and k=2, the first signal (a long sequence) may be truncated into three parts (three short sequences), for example, S1, S2, and S3, where S1 and S2 correspond to the BWP #1, and S3 corresponds to the BWP #2. The terminal device sends S1 and S2 on the BWP #1, and sends S3 on the BWP #2.

In a possible implementation, the signal sent in the $i^{th}$ time element includes p sub-signals. The p sub-signals correspond to the k frequency domain resources, where p is a positive integer.

In a possible implementation, the p sub-signals are generated based on the indication information of the k frequency domain resources. The indication information of the k frequency domain resources includes at least one of the following: the indication information of the k BWPs, and start frequencies, sizes, and ranges that are of the k frequency domain resources.

In the foregoing manner, the p sub-signals are independently generated short sequences. Each sub-signal may be sent on one or more of the k frequency domain resources. One of the p sub-signals is used as an example. If the sub-signal is a reference signal, a sequence length of the sub-signal is related to a bandwidth size or range of an occupied frequency domain resource. To be specific, a larger bandwidth size of the occupied frequency domain resource may indicate a longer sequence length of the sub-signal. Alternatively, the sequence length of the sub-signal is related to whether the bandwidth range of the occupied frequency domain resource is at a low frequency or a high frequency. Compared with a long sequence truncation manner, the foregoing manner has less impact on the current standard protocol. In addition, a generation rule may be more flexible.

It should be noted that a value of p may be the same as or different from a value of k.

If a value of p is the same as a value of k, for example, when p=2 and k=2, the first frequency domain resource is located on a BWP #1 (5 MHz) and a BWP #2 (95 MHz), a reference signal SRS #1 may be generated on the BWP #1, and a phase tracking sequence S2 may be generated on the BWP #2. For example, a corresponding sub-signal may be generated based on a BWP size and/or a subcarrier component spacing. The terminal device sends the SRS #1 on the BWP #1, and sends the S2 on the BWP #2. If a value of p is different from a value of k, for example, when p=2 and k=3, the first frequency domain resource is located on a BWP #1 (5 MHz), a BWP #2 (85 MHz), and a BWP #3 (10 MHz), a reference signal SRS #1 may be generated on the BWP #1 and the BWP #2, and a phase tracking sequence S2 may be generated on the BWP #3. For example, a corresponding sub-signal may be generated based on a BWP size and/or a subcarrier component spacing. The terminal device sends the SRS #1 on the BWP #1 and the BWP #2, and sends the S2 on the BWP #3.

In a possible implementation, a bandwidth of the first frequency domain resource does not exceed a first preset value.

In the foregoing manner, the first preset value may be a bandwidth of a single carrier component (for example, 100 MHz), or may be another bandwidth value. A bandwidth size of the first frequency domain resource is limited, so that it can be ensured that the sending end device does not greatly increase costs, complexity, and power consumption of the device. For example, when bandwidths of the m frequency domain resources do not exceed the first preset value, the terminal device does not need to support a bandwidth that exceeds the first preset value, and may send a small-bandwidth signal for a plurality of times in a frequency hopping manner, to obtain an effect of a large-bandwidth signal.

In a possible implementation, the $i^{th}$ time element is adjacent to the $j^{th}$ time element.

In the foregoing manner, because the time elements for sending are adjacent, a channel change corresponding to the $i^{th}$ time element and the $j^{th}$ time element is relatively small, and a more accurate phase estimation result can be obtained, thereby improving positioning precision.

Optionally, the $i^{th}$ time element is not adjacent to the $j^{th}$ time element.

In the foregoing manner, if the $i^{th}$ time element is not adjacent to the $j^{th}$ time element, flexibility of the sending end may be increased. For example, another signal may be sent at any moment between the $i^{th}$ time element and the $j^{th}$ time element.

In a possible implementation, each of the at least two carrier components may be a segment of spectrum that is consecutive in frequency, or may be a segment of spectrum that is inconsecutive in frequency. In addition, any two adjacent carrier components of the at least two carrier components are consecutive in frequency domain, or may be inconsecutive in frequency domain.

In a possible implementation, a guard band between any two adjacent carrier components of the at least two carrier components is greater than or equal to 0 Hz.

In a possible implementation, the signal sent in the $i^{th}$ time element includes at least one phase tracking reference signal. A frequency domain resource of the phase tracking reference signal is located at the overlapping part of the first frequency domain resource and the second frequency domain resource.

In a possible implementation, the m signals are sent in the m time elements. The first frequency domain resource used by the signal sent in the $i^{th}$ time element is distributed on a first overlapping carrier component (overlapping carrier component, overlapping CC). The second frequency domain resource used by the signal sent in the $j^{th}$ time element partially overlaps with the first frequency domain resource, where i is less than or equal to m, j is less than or equal to m, and i and j are different. The first overlapping carrier component is a new carrier component that spans at least two carrier components.

In the foregoing manner, the terminal device may send a signal on the BWP located on the first overlapping carrier component, and does not need to support the carrier aggregation capability, so that cost complexity of the terminal device can be reduced. It should be noted that the second frequency domain resource may be located on a second overlapping carrier component, or may be located on a common carrier component.

S150: The network device processes the m signals.

In a possible implementation, the network device receives signals that are sent by the terminal device in the m time elements (if the frequency hopping manner is used, the m time elements correspond to m frequency hopping moments), then estimates, based on a channel estimation result of the frequency domain overlapping part, a phase difference between signals in two consecutive time elements (if the frequency hopping manner is used, the two time elements correspond to two frequency hopping moments), and then performs phase compensation in time domain, to align the m signals to a same phase. The network device superimposes the m signals in time domain, to restore a large-bandwidth signal. Optionally, the large-bandwidth signal may be used for positioning.

In a possible implementation, the network device estimates a phase based on a signal that is carried on a third frequency domain resource and that is received in the $i^{th}$ time element and a signal that is carried on the third frequency domain resource and that is received in the $j^{th}$ time element. The third frequency domain resource includes the overlapping part between the first frequency domain resource and the second frequency domain resource.

It should be noted that not all of the foregoing steps are mandatory, some of the foregoing steps may be omitted, and a similar effect can also be achieved.

The following describes the method 100 by using examples with reference to FIG. 4 to FIG. 8.

Figure 4:
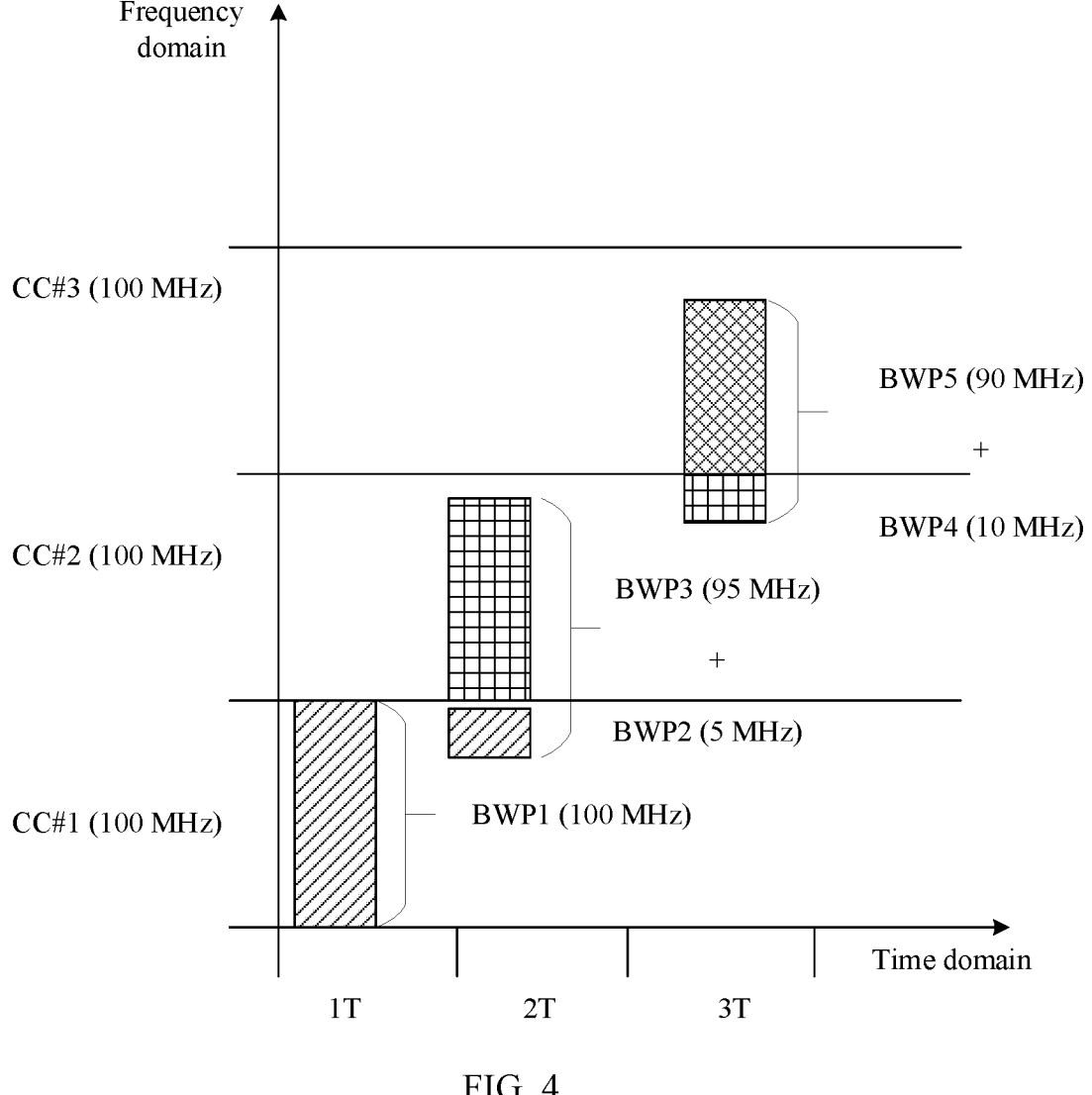
FIG. 4 is a schematic diagram of an example of a signal transmission method applied to an embodiment of this application.

FIG. 4 is a schematic diagram of an example of a signal transmission method applied to an embodiment of this application. In FIG. 4, an uplink positioning method is used as an example for description. To be specific, a terminal device (a sending end) sends an uplink reference signal, and a network device (a receiving end) receives the reference signal and uses the reference signal for positioning. The same method is also applicable to a downlink positioning method, a joint uplink and downlink positioning method, and the like. This is not limited in this application.

As shown in FIG. 4, for example, a frequency domain resource #1 is a frequency domain resource corresponding to a CC #1. For example, the frequency domain resource #1 includes a BWP1. The BWP1 is located on the CC #1, and a bandwidth of the BWP1 is 100 MHz. A frequency domain resource #2 includes a part of a frequency domain resource of a CC #2 and a part of the frequency domain resource of the CC #1. For example, the frequency domain resource #2 includes a BWP2 and a BWP3. The BWP2 is located on the CC #1, and a bandwidth of the BWP2 is 5 MHz. The BWP3 is located on the CC #2, and a bandwidth of the BWP3 is 95 MHz. A frequency domain resource #3 includes a part of the frequency domain resource of the CC #2 and a part of a frequency domain resource of a CC #3. For example, the frequency domain resource #3 includes a BWP4 and a BWP5. The BWP4 is located on the CC #2, and a bandwidth of the BWP2 is 10 MHz. The BWP5 is located on the CC #3, and a bandwidth of the BWP3 is 90 MHz. It should be understood that, in this embodiment of this application, the terminal device may send corresponding signals on the frequency domain resource #1, the frequency domain resource #2, and the frequency domain resource #3 in a frequency hopping manner. This is not limited in this application.

In a possible implementation, bandwidths of the frequency domain resource #1, the frequency domain resource #2, and the frequency domain resource #3 do not exceed a bandwidth of a single carrier component, for example, do not exceed 100 MHz. A bandwidth occupied by a corresponding SRS sequence may be less than or equal to 100 MHz, that is, a length of each SRS sequence is related to a bandwidth size of a corresponding frequency domain resource.

There is a plurality of mapping manners of an SRS sequence on a corresponding frequency domain resource. For example, a sequence sent on the frequency domain resource #2 is mapped in the following two manners:

Mapping Manner 1

The terminal device generates a long sequence SRS #A, and the SRS #A corresponds to the frequency domain resource #2.

The SRS #A is generated based on indication information of the frequency domain resource #2. The indication information includes at least one of the following: indication information of the BWP2 and the BWP3, and a start frequency, a size, and a range that are of the frequency domain resource #2.

An SRS #A1 and an SRS #A2 are obtained by truncating the long sequence SRS #A. The SRS #A1 corresponds to the BWP2, and the SRS #A2 corresponds to the BWP3.

Mapping Manner 2

The terminal device generates an SRS #B and an SRS #C based on indication information of the frequency domain resource #2. The SRS #B and the SRS #C respectively correspond to the BWP2 and the BWP3. The indication information includes at least one of the following: indication information of the BWP2 and the BWP3, and a start frequency, a size, and a range that are of the frequency domain resource #2. A sequence sent on the BWP2 may be a phase tracking sequence of 5 MHz. A sequence sent on the BWP3 may be an SRS sequence.

In a first time element 1T, the terminal device sends an SRS #1 of 100 MHz on the BWP1 located on the carrier component CC #1.

In a second time element 2T, when the foregoing mapping manner 1 is used as an example, the terminal device sends an SRS #A1 of 5 MHz on the BWP2 located on the carrier component CC #1, and sends an SRS #A2 of 95 MHz on the BWP3 located on the carrier component CC #2; and when the foregoing mapping manner 2 is used as an example, the terminal device sends a phase tracking sequence of 5 MHz on the BWP2 located on the carrier component CC #1, and sends an SRS sequence of 95 MHz on the BWP3 located on the carrier component CC #2.

Figure 5:
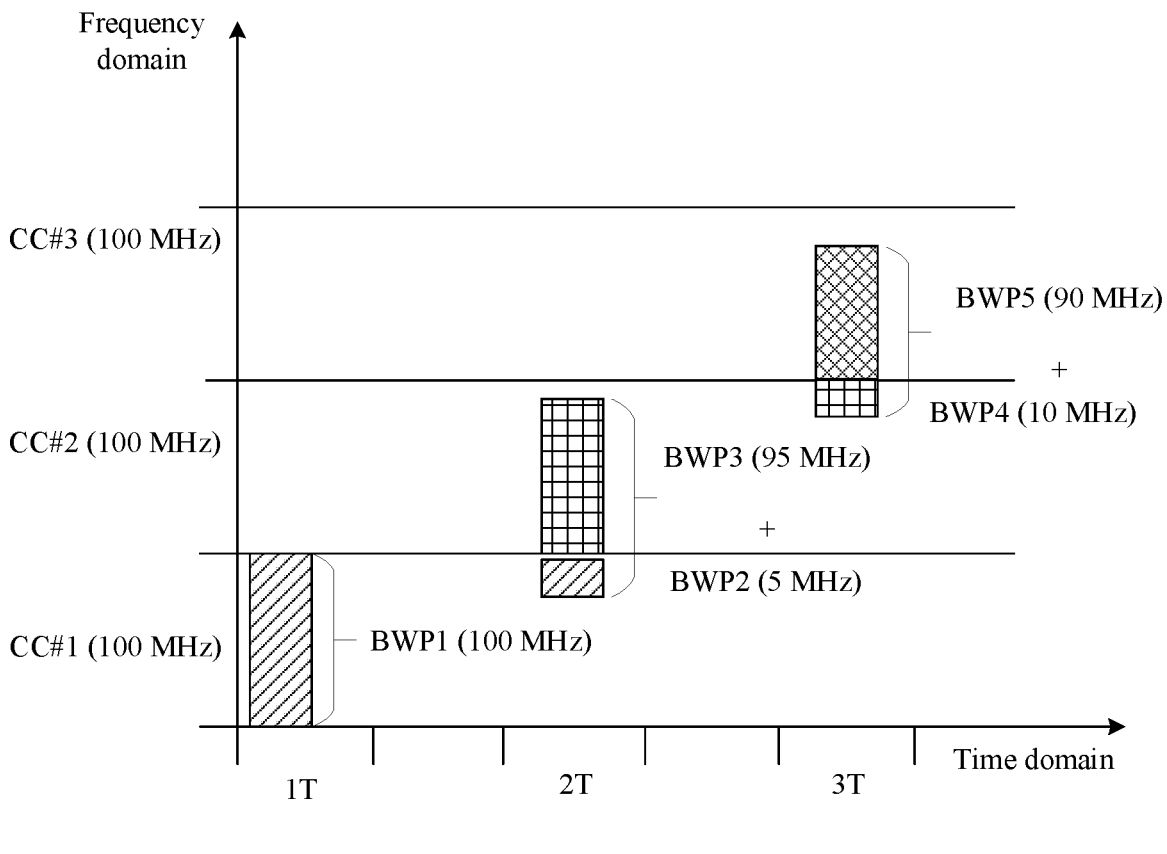
FIG. 5 is a schematic diagram of another example of a signal transmission method applied to an embodiment of this application.

In a third time element 3T, the terminal device sends an SRS #4 of 10 MHz on the BWP4 located on the carrier component CC #2, and sends an SRS #5 of 90 MHz on the BWP5 located on the carrier component CC #3. Any two SRS sequences in the SRS #1 to the SRS #5 may be the same or may be different. In addition, a length of each SRS sequence is related to a bandwidth size of a BWP in which the SRS sequence is located. It should be noted that, each time element T for sending includes an actual signal sending time and a re-tuning time of a phase-locked loop. 1T and 2T may be adjacent time elements, or may be non-adjacent time elements, that is, 1T and 2T may be spaced by several symbols or slots. Alternatively, 2T and 3T may be adjacent time elements, or may be non-adjacent time elements, that is, 2T and 3T may be spaced by several symbols or slots. For a case in which 1T and 2T are non-adjacent time elements, and 2T and 3T are non-adjacent time elements, refer to FIG. 5 (FIG. 5 is a schematic diagram of still another information transmission method according to an embodiment of this application) for understanding.

It can be learned that the frequency domain resource #1 partially overlaps with the frequency domain resource #2, namely, the BWP2. The overlapping part may be used to estimate a phase difference between the CC #1 and the CC #2. There may be a part interval between the BWP2 and the BWP3 in frequency domain. It indicates that there may be a guard interval between the CC #1 and the CC #2, and the guard interval is greater than or equal to 0 Hz. It should be noted that the BWP2 may be a newly defined BWP on the carrier component CC #1 (a definition of the newly defined BWP herein is different from that of a current BWP, the newly defined BWP is distributed on at least two carrier components, while the current BWP is distributed on a single carrier component), or may be a part of the BWP1. The frequency domain resource #3 partially overlaps with the frequency domain resource #2, namely, an overlapping part between the BWP4 and the BWP3. The overlapping part may be used to estimate a phase difference between the CC #2 and the CC #3. There is no interval between the BWP4 and the BWP5. It indicates that there may be no interval between the CC #3 and the CC #2. It should be noted that, because the frequency domain resource #2 corresponds to two BWPs, the terminal device needs to send a signal of the frequency domain resource #2 in a carrier aggregation manner. Similarly, the terminal device needs to send a signal of the frequency domain resource #3 in a carrier aggregation manner.

Figure 6:
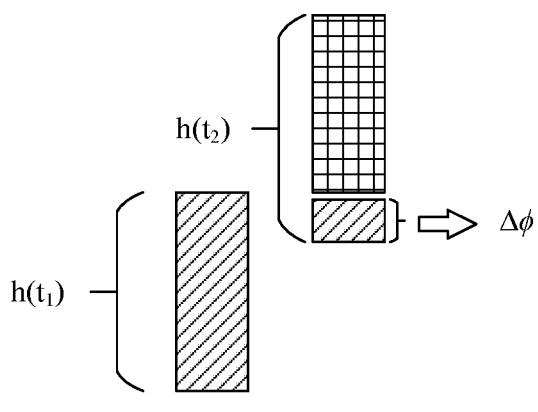
FIG. 6 is a schematic diagram of an example of a method for estimating a phase difference according to an embodiment of this application.

A method for estimating a phase difference based on an overlapping part is as follows, an example in which a phase difference between the CC #1 and the CC #2 is estimated is used, and refer to FIG. 6 (FIG. 6 is a schematic diagram of an example of a method for estimating a phase difference according to an embodiment of this application):

For example, a channel gain/channel coefficient on the frequency domain resource #1 is $h(t_1)$, where $h(t_1)=a(t_1)e^{-jh}$, $t_1$ is a first time element, $a(t_1)$ is an amplitude of the channel gain/channel coefficient $h(t_1)$ corresponding to the time element $t_1$, and $\phi_1$ is a phase of $h(t_1)$. A channel gain/channel coefficient on the frequency domain resource #2 is $h(t_2)$, where $h(t_2)=a(t_2)e^{-j\phi_2}$, $t_2$ is a second time element, $a(t_2)$ is an amplitude of the channel gain/channel coefficient $h(t_2)$ corresponding to the time element $t_2$, and $\phi_2$ is a phase of $h(t_2)$. A phase difference between $h(t_1)$ and $h(t_2)$ is $\Delta\phi$, where $\Delta\phi=\phi_2-\phi_1$, and $\Delta\phi$ may be obtained by using a channel estimation method. For example, the network device may obtain $\Delta\phi$ through division of $h(t_1)$ and $h(t_2)$ based on channel estimation, that is, $h(t_2)/h(t_1)\approx e^{-j(\phi_2-\phi_1)}$. Alternatively, another method may be used. This is not limited in the present invention.

It should be noted that at least two of the frequency domain resource #1, the frequency domain resource #2, and the frequency domain resource #3 partially overlap with each other. For example, the frequency domain resource #1 and the frequency domain resource #2 partially overlap with each other, for example, the BWP2, and the frequency domain resource #2 and the frequency domain resource #3 may partially overlap with each other, or may not overlap with each other. Alternatively, the frequency domain resource #2 and the frequency domain resource #3 partially overlap with each other, and the frequency domain resource #1 and the frequency domain resource #2 may partially overlap with each other, or may not overlap with each other.

The frequency domain resource #1, the frequency domain resource #2, and the frequency domain resource #3 may be configured and activated by the network device. The BWP2 and the BWP3 that correspond to the frequency domain resource #2 need to be simultaneously activated or deactivated by the network device. The BWP4 and the BWP5 that correspond to the frequency domain resource #3 need to be simultaneously activated or deactivated by the network device. That is, if one frequency domain resource corresponds to a plurality of BWPs, the plurality of BWPs need to be simultaneously activated or deactivated by the network device.

For example, after the terminal device sends a corresponding signal on each frequency domain resource and each time element, the network device correspondingly receives the corresponding signal on each resource, estimates, based on a channel estimation result of the frequency domain overlapping part, a phase difference between two consecutive frequency hopping signals, and then performs phase compensation in time domain, to align signals at several moments to a same phase. The network device superimposes, in time domain, signals received at a plurality of (frequency hopping) moments, to restore a large-bandwidth signal. The large-bandwidth signal may be used for positioning.

In FIG. 4, because one frequency domain resource may correspond to a plurality of BWPs, the terminal device needs to send a signal in a carrier aggregation manner when sending the signal on the frequency domain resource. However, in FIG. 7 and FIG. 8, because of a definition of a new BWP or a new carrier component, when one frequency domain resource corresponds to a plurality of BWPs, the terminal device does not need to support a carrier aggregation capability when sending data on the frequency domain resource. A definition of the new BWP is different from that of a current BWP. The new BWP is distributed on at least two carrier components, while the current BWP is distributed on a single carrier component. The new carrier component (or may be referred to as an overlapping carrier component overlapping CC) is defined as a carrier component that may span a plurality of current carrier components and may overlap with each other.

Figure 7:
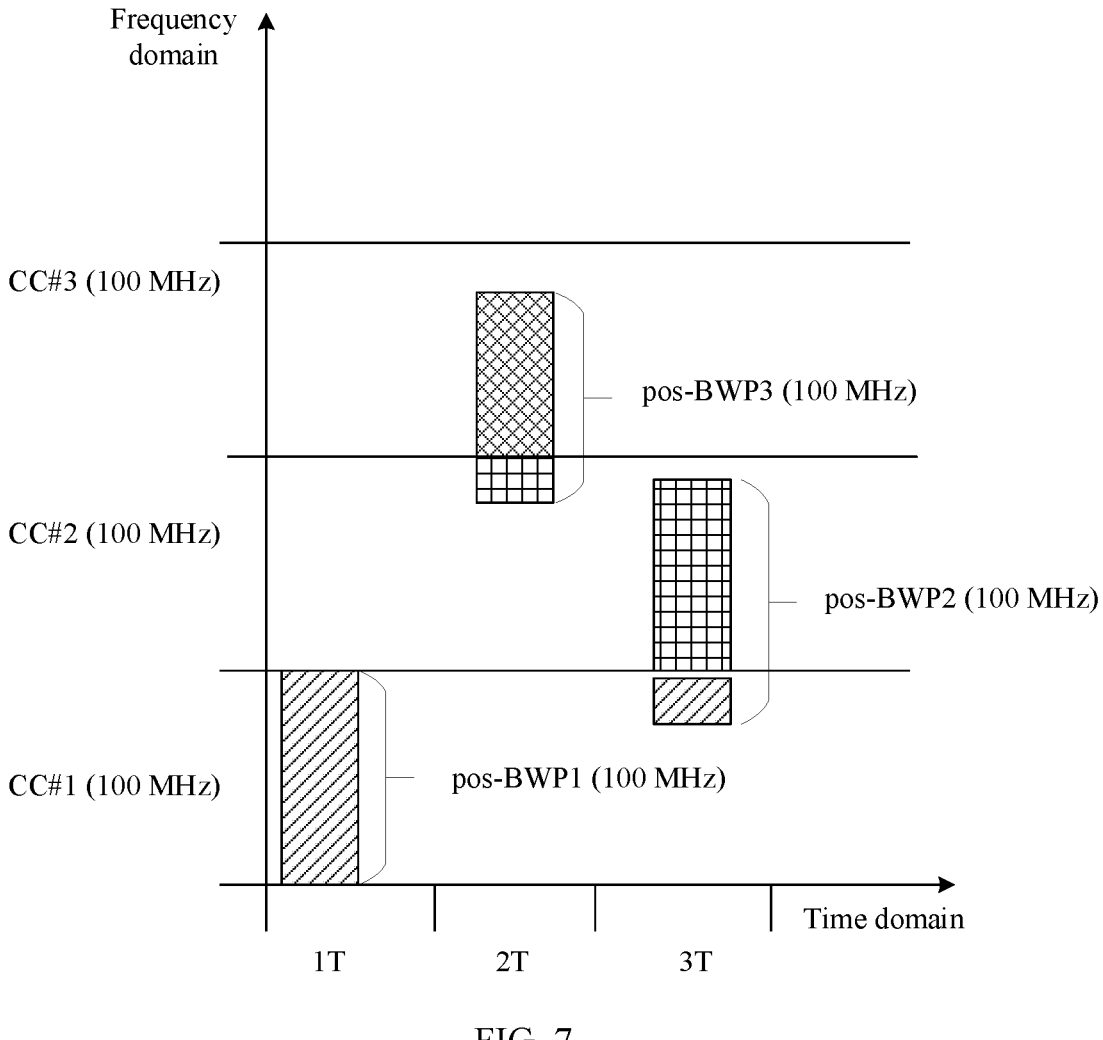
FIG. 7 is a schematic diagram of another example of a signal transmission method applied to an embodiment of this application.

FIG. 7 is a schematic diagram of another example of a signal transmission method applied to an embodiment of this application. In FIG. 7, an uplink positioning method is used as an example for description. To be specific, a terminal device (a sending end) sends an uplink reference signal, and a network device (a receiving end) receives the reference signal and uses the reference signal for positioning. The same method is also applicable to a downlink positioning method, a joint uplink and downlink positioning method, and the like. This is not limited in this application.

A new BWP (or referred to as a pos-BWP) in FIG. 7 is a BWP defined or configured on one or more carrier components. A bandwidth of each pos-BWP does not exceed a bandwidth of one carrier component (for example, 100 MHz). A frequency domain resource #1 is a frequency domain resource corresponding to a CC #1. For example, the frequency domain resource #1 includes a pos-BWP1, where the pos-BWP1 is located on the CC #1, and a bandwidth of the pos-BWP1 is 100 MHz. A frequency domain resource #2 is a frequency domain resource corresponding to a part of a CC #2 and a part of the CC #1. For example, the frequency domain resource #2 includes a pos-BWP2, where the pos-BWP2 is located on the CC #1 and the CC #2, and a bandwidth of the pos-BWP2 is 100 MHz. A frequency domain resource #3 is a frequency domain resource corresponding to a part of the CC #2 and a part of a CC #3. The frequency domain resource #3 includes a pos-BWP3, where the pos-BWP3 is located on the CC #1 and the CC #2, and a bandwidth of the pos-BWP3 is 100 MHz. It should be understood that, in this embodiment of this application, the terminal device may send corresponding signals on the frequency domain resource #1, the frequency domain resource #2, and the frequency domain resource #3 in a frequency hopping manner. This is not limited in this application.

In a possible implementation, bandwidths of the frequency domain resource #1, the frequency domain resource #2, and the frequency domain resource #3 do not exceed a bandwidth of a single carrier component, for example, do not exceed 100 MHz. A bandwidth occupied by a corresponding SRS sequence may be less than or equal to 100 MHz, that is, a length of each SRS sequence is related to a bandwidth size of a corresponding frequency domain resource.

In a first time element 1T, the terminal device sends an SRS #1 of 100 MHz on the pos-BWP1 located on the carrier component CC #1; in a second time element 2T, the terminal device sends an SRS #2 of 100 MHz on the pos-BWP3 located on the carrier component CC #2 and the carrier component CC #3; and in a third time element 3T, the terminal device sends an SRS #3 of 100 MHz on the pos-BWP2 located on the carrier component CC #1 and the carrier component CC #2. Any two SRS sequences in the SRS #1 to the SRS #3 may be the same or may be different. In addition, a length of each SRS sequence is related to a bandwidth size of a BWP in which the SRS sequence is located. It should be noted that, each time element T for sending includes an actual signal sending time and a re-tuning time of a phase-locked loop. 1T and 2T may be adjacent time elements, or may be non-adjacent time elements, that is, 1T and 2T may be spaced by several symbols or slots. Alternatively, 2T and 3T may be adjacent time elements, or may be non-adjacent time elements, that is, 2T and 3T may be spaced by several symbols or slots. A case in which 1T and 2T are non-adjacent time elements, and 2T and 3T are non-adjacent time elements is similar to that shown in FIG. 5. Details are not described herein again.

It can be learned that the frequency domain resource #1 partially overlaps with the frequency domain resource #2, namely, an overlapping part between the pos-BWP1 and the pos-BWP2. The overlapping part may be used to estimate a phase difference between the CC #1 and the CC #2. There may be a guard interval between the CC #1 and the CC #2, and the guard interval is greater than or equal to 0 Hz. The frequency domain resource #3 partially overlaps with the frequency domain resource #2, namely, an overlapping part between the pos-BWP2 and the pos-BWP3. The overlapping part may be used to estimate a phase difference between the CC #2 and the CC #3. There may be no interval, in frequency domain, between the pos-BWP2 and the pos-BWP3. It indicates that there may be no guard interval between the CC #3 and the CC #2.

It should be noted that at least two of the frequency domain resource #1, the frequency domain resource #2, and the frequency domain resource #3 partially overlap with each other. For example, the frequency domain resource #1 and the frequency domain resource #2 partially overlap with each other, and the frequency domain resource #2 and the frequency domain resource #3 may partially overlap with each other, or may not overlap with each other. Alternatively, the frequency domain resource #2 and the frequency domain resource #3 partially overlap with each other, and the frequency domain resource #1 and the frequency domain resource #2 may partially overlap with each other, or may not overlap with each other. For calculation of a phase difference between two adjacent signals based on signals of overlapping resources, refer to the foregoing method. Details are not described herein again.

A manner of generating an SRS sequence is described by using an SRS sequence on the frequency domain resource #2 as an example:

The terminal device generates an SRS #D based on indication information of the frequency domain resource #2. To be specific, the SRS #D corresponds to the frequency domain resource #2, and a sequence length of the SRS #D is related to a bandwidth size of the frequency domain resource #2.

The indication information of the frequency domain resource #2 includes at least one of the following: indication information of the pos-BWP2, and a start frequency, a size, and a range that are of the frequency domain resource #2.

The foregoing frequency domain resources (pos-BWP) may be configured and activated by the network device. An initial location of the pos-BWP is configured in the following two manners:

Manner 1

For example, a Point A of a located primary carrier component is used as a reference point, and the initial location of the pos-BWP is determined through setting a value of offsetTocarrier component. For example, offsetTocarrier component may be a negative value. The pos-BWP3 is used as an example. CC #3-Point A may be used as a reference point, and offsetTocarrier component is −10. In this case, an initial location of the pos-BWP3 is ((CC #3-Point A)−10). Optionally, a bandwidth of the pos-BWP does not exceed a bandwidth of a carrier component, for example, 100 MHz.

Manner 2

For example, a lowest frequency of a frequency band supported by a cell is used as a reference point. For example, if the lowest frequency of the frequency band supported by the cell is a lowest frequency of the CC #1, the initial location of pos-BWP #3 is the lowest frequency of the CC #1 plus 190 MHz.

Each pos-BWP may be activated by being triggered by the network device, or may be activated by being independently triggered by the terminal device, or may be activated by the network device and the terminal device through negotiation. This is not limited in this application.

For example, after the terminal device sends each signal on each frequency domain resource and each time element, the network device correspondingly receives each signal on each resource, estimates, based on a channel estimation result of the frequency domain overlapping part, a phase difference between two consecutive frequency hopping signals, and then performs phase compensation in time domain, to align signals at several moments to a same phase. The network device superimposes, in time domain, signals received at a plurality of (frequency hopping) moments, to restore a large-bandwidth signal. The large-bandwidth signal may be used for positioning.

Figure 8:
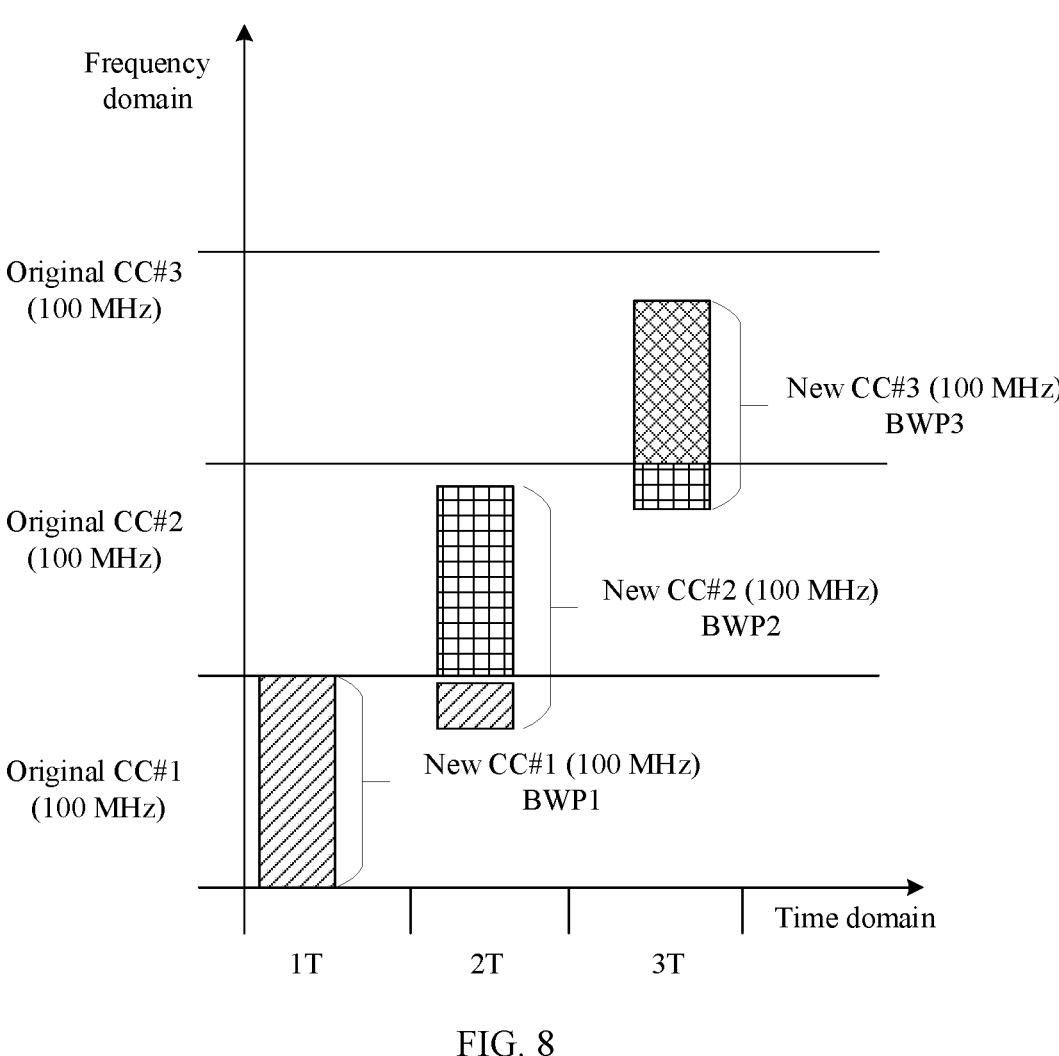
FIG. 8 is a schematic diagram of still another example of a signal transmission method applied to an embodiment of this application.

FIG. 8 is a schematic diagram of still another example of a signal transmission method applied to an embodiment of this application. In FIG. 8, an uplink positioning method is used as an example for description. To be specific, a terminal device (a sending end) sends an uplink reference signal, and a network device (a receiving end) receives the reference signal and uses the reference signal for positioning. The same method is also applicable to a downlink positioning method, a joint uplink and downlink positioning method, and the like. This is not limited in this application.

In FIG. 8, a new CC #1 is a carrier component defined on an original carrier component CC #1, a new CC #2 is a carrier component defined on the original carrier component CC #1 and an original carrier component CC #2 and partially overlaps with the new CC #1, and a new CC #3 is a carrier component defined on the original carrier component CC #2 and an original carrier component CC #3 and partially overlaps with the new CC #2. A frequency domain resource #1 is a frequency domain resource corresponding to the new CC #1. For example, the frequency domain resource #1 includes a BWP1, where the BWP1 is located on the new CC #1, and a bandwidth of the BWP1 is 100 MHz. A frequency domain resource #2 is a frequency domain resource corresponding to the new CC #2. For example, the frequency domain resource #2 includes a BWP2, where the BWP2 is located on the new CC #2, and a bandwidth of the BWP2 is 100 MHz. A frequency domain resource #3 is a frequency domain resource corresponding to the new CC #3. For example, the frequency domain resource #3 includes a BWP3, where the BWP3 is located on the new CC #3, and a bandwidth of the BWP3 is 100 MHz. It should be understood that, in this embodiment of this application, the terminal device may send corresponding signals on the frequency domain resource #1, the frequency domain resource #2, and the frequency domain resource #3 in a frequency hopping manner. This is not limited in this application.

In a possible implementation, bandwidths of the frequency domain resource #1, the frequency domain resource #2, and the frequency domain resource #3 do not exceed a bandwidth of a single carrier component, for example, do not exceed 100 MHz. A bandwidth occupied by a corresponding SRS sequence may be less than or equal to 100 MHz, that is, a length of each SRS sequence is related to a bandwidth size of a corresponding frequency domain resource.

In a first time element 1T, the terminal device sends an SRS #1 of 100 MHz on the BWP1 located on the new carrier component CC #1; in a second time element 2T, the terminal device sends an SRS #2 of 100 MHz on the BWP2 located on the new carrier component CC #2; and in a third time element 3T, the terminal device sends an SRS #3 of 100 MHz on the BWP3 located on the new carrier component CC #3. Any two SRS sequences in the SRS #1 to the SRS #3 may be the same or may be different. In addition, a length of each SRS sequence is related to a bandwidth size of a BWP in which the SRS sequence is located. It should be noted that, each time element T for sending includes an actual signal sending time and a re-tuning time of a phase-locked loop. 1T and 2T may be adjacent time elements, or may be non-adjacent time elements, that is, 1T and 2T may be spaced by several symbols or slots. Alternatively, 2T and 3T may be adjacent time elements, or may be non-adjacent time elements, that is, 2T and 3T may be spaced by several symbols or slots. A case in which 1T and 2T are non-adjacent time elements, and 2T and 3T are non-adjacent time elements is similar to that shown in FIG. 5. Details are not described herein again.

It can be learned that the frequency domain resource #1 partially overlaps with the frequency domain resource #2, namely, an overlapping part between the BWP1 and the BWP2. The overlapping part may be used to estimate a phase difference between the new CC #1 and the new CC #2. The new CC #2 may be defined on two consecutive currently defined carrier components, and there may be a guard interval between the two consecutive currently defined carrier components, where the guard interval is greater than or equal to 0 Hz. The frequency domain resource #3 partially overlaps with the frequency domain resource #2, namely, an overlapping part between the BWP2 and the BWP3. The overlapping part may be used to estimate a phase difference between the new CC #2 and the new CC #3, and there may be no interval between the BWP2 and the BWP3.

It should be noted that at least two of the frequency domain resource #1, the frequency domain resource #2, and the frequency domain resource #3 partially overlap with each other. For example, the frequency domain resource #1 and the frequency domain resource #2 partially overlap with each other, and the frequency domain resource #2 and the frequency domain resource #3 may partially overlap with each other, or may not overlap with each other. Alternatively, the frequency domain resource #2 and the frequency domain resource #3 partially overlap with each other, and the frequency domain resource #1 and the frequency domain resource #2 may partially overlap with each other, or may not overlap with each other. For calculation of a phase difference between two adjacent signals based on signals of overlapping resources, refer to the foregoing method. Details are not described herein again.

A manner of generating an SRS sequence is described by using an SRS sequence on the frequency domain resource #2 as an example:

The terminal device generates an SRS #E based on indication information of the frequency domain resource #2. To be specific, the SRS #E corresponds to the frequency domain resource #2, and a sequence length of the SRS #E is related to a bandwidth size of the frequency domain resource #2.

The indication information of the frequency domain resource #2 includes at least one of the following: indication information of the BWP2, and a start frequency, a size, and a range that are of the frequency domain resource #2.

The foregoing frequency domain resources may be configured and activated by the network device on each new carrier component. The following uses the frequency domain resource #2 as an example to describe a possible implementation of configuring a frequency domain resource.

In a possible implementation, the network device adds configuration information of an overlapping part (that is, information about the overlapping part between the frequency domain resource #1 and the frequency domain resource #2) based on related configuration information of the original carrier component CC #2 (for related configuration information of the original carrier component CC #2, refer to configuration information of the currently defined carrier component), and avoids a conflict with resource allocation of the original carrier component CC #1 through resource scheduling.

In another possible implementation, the network device performs configuration in a unit of the new carrier component CC #2, and avoids a conflict with resource allocation of the original carrier component CC #1 through resource scheduling.

For example, after the terminal device sends each signal on each frequency domain resource and each time element, the network device correspondingly receives each signal on each resource, estimates, based on a channel estimation result of the frequency domain overlapping part, a phase difference between two consecutive frequency hopping signals, and then performs phase compensation in time domain, to align signals at several moments to a same phase. The network device superimposes, in time domain, signals received at a plurality of (frequency hopping) moments, to restore a large-bandwidth signal. The large-bandwidth signal may be used for positioning.

Figure 9:
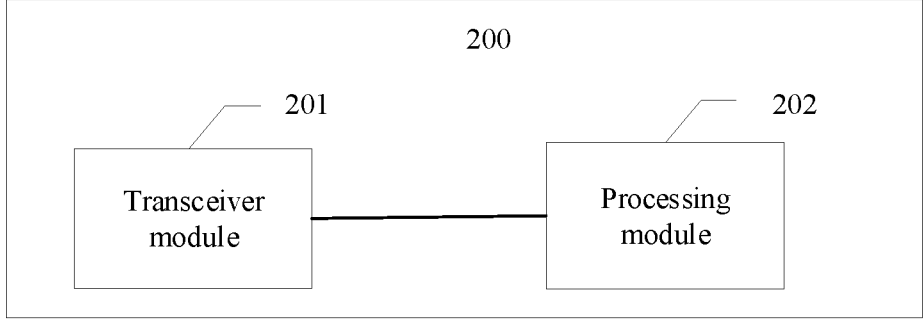
FIG. 9 is a schematic diagram of a possible structure of a communication apparatus according to an embodiment of this application.
Figure 10:
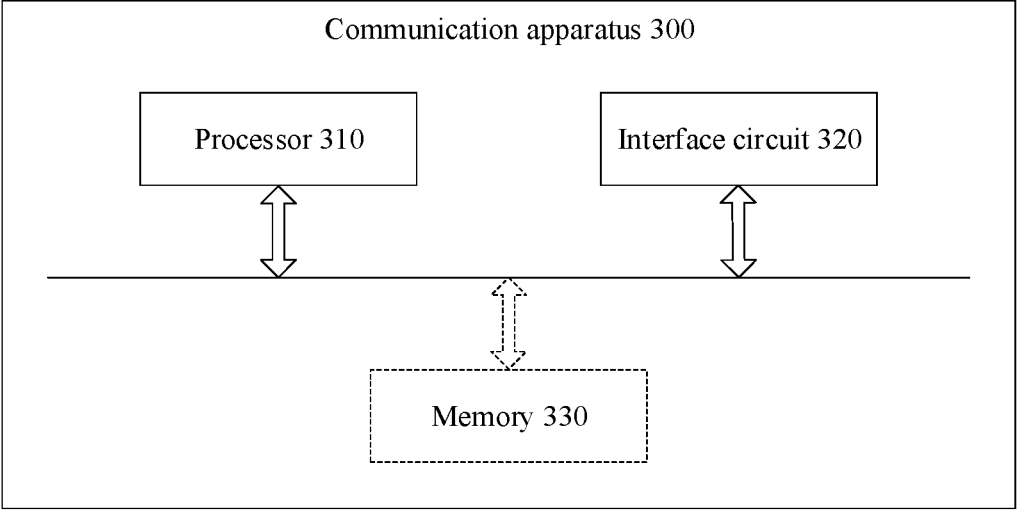
FIG. 10 is a schematic diagram of another example of a possible structure of a communication apparatus according to an embodiment of this application.

FIG. 9 and FIG. 10 are schematic diagrams of possible structures of communication apparatuses according to embodiments of this application. The communication apparatuses may implement the functions of the terminal device or the network device in the foregoing method embodiments. Therefore, beneficial effects of the foregoing method embodiments can also be implemented. In this embodiment of this application, the communication apparatus may be the terminal device in the method 100, or may be the network device in the method 100, or may be a module (for example, a chip) used in the terminal device or an access network device.

As shown in FIG. 9, the communication apparatus 200 includes a transceiver module 201 and a processing module 202. The communication apparatus 200 may be configured to implement the functions of the terminal device or the network device in the method embodiment shown in FIG. 2.

When the communication apparatus 200 is configured to implement the functions of the terminal device in the method embodiment in FIG. 2: The processing module 202 is configured to generate m signals, where m is a positive integer greater than or equal to 2; and the transceiver module 201 is configured to send the m signals on m resources, where the m resources correspond to m frequency domain resources in frequency domain, the m resources correspond to m time elements in time domain, a first frequency domain resource used by a signal carried in an $i^{th}$ time element is distributed on at least two carrier components, a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j.

When the communication apparatus 200 is configured to implement the functions of the network device in the method embodiment shown in FIG. 2: The transceiver module 201 is configured to receive m signals, where m is a positive integer greater than or equal to 2, the m signals are located on m resources, the m resources correspond to m frequency domain resources in frequency domain, the m resources correspond to m time elements in time domain, a first frequency domain resource used by a signal carried in an $i^{th}$ time element is distributed on at least two carrier components, a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j; and the processing module 202 is configured to estimate a phase based on a signal that is carried on a third frequency domain resource and that is received in the $i^{th}$ time element and a signal that is carried on the third frequency domain resource and that is received in the $j^{th}$ time element. The third frequency domain resource includes an overlapping part between the first frequency domain resource and the second frequency domain resource.

For more detailed descriptions of the transceiver module 201 and the processing module 202, refer to related descriptions in the foregoing method embodiments. Details are not described herein again.

As shown in FIG. 10, the communication apparatus 300 includes a processor 310 and an interface circuit 320. The processor 310 and the interface circuit 320 are coupled to each other. It may be understood that the interface circuit 320 may be a transceiver or an input/output interface. Optionally, the communication apparatus 300 may further include a memory 330, configured to store instructions executed by the processor 310, or store input data needed by the processor 310 to run instructions, or store data generated after the processor 310 runs instructions.

When the communication apparatus 300 is configured to implement the method in the foregoing method embodiments, the processor 310 is configured to perform the functions of the processing module 202, and the interface circuit 320 is configured to perform the functions of the transceiver module 201.

When the communication apparatus is a chip used in the terminal device, the chip in the terminal device implements the functions of the terminal device in the foregoing method embodiments. The chip in the terminal device receives information from another module (for example, a radio frequency module or an antenna) in the terminal device, and the information is sent by the network device to the terminal device. Alternatively, the chip in the terminal device sends information to another module (for example, a radio frequency module or an antenna) in the terminal device, and the information is sent by the terminal device to the network device.

When the communication apparatus is a chip used in the network device, the chip in the network device implements the functions of the network device in the foregoing method embodiments. The chip in the network device receives information from another module (for example, a radio frequency module or an antenna) in the network device, and the information is sent by the terminal device to the network device. Alternatively, the chip in the network device sends information to another module (for example, a radio frequency module or an antenna) in the network device, and the information is sent by the network device to the terminal device.

It may be understood that the processor in embodiments of this application may be a central processing unit (central processing unit, CPU), or may be another general-purpose processor, a digital signal processor (digital signal processor, DSP), an application specific integrated circuit (application specific integrated circuit, ASIC), a field programmable gate array (field programmable gate array, FPGA) or another programmable logic device, a transistor logic device, a hardware component, or any combination thereof. The general-purpose processor may be a microprocessor, or may be any conventional processor.

The method steps in embodiments of this application may be implemented by hardware, or may be implemented by the processor executing software instructions. The software instructions may include corresponding software modules. The software modules may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in the access network device or the terminal device. Certainly, the processor and the storage medium may exist in the network device or the terminal device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the processes or the functions in embodiments of this application are performed. The computer may be a general-purpose computer, a dedicated computer, a computer network, or another programmable apparatus. The computer programs or instructions may be stored in a computer-readable storage medium, or may be transmitted through the computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, a solid state disk (solid state disk, SSD).

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes. It should be noted that not all of the steps in embodiments of this application are mandatory, some of the steps may be omitted, and a similar effect can also be achieved.

What is claimed is:

1. A signal transmission method, comprising:

generating m signals, wherein m is a positive integer greater than or equal to 2; and sending the m signals on m resources, wherein the m resources correspond to m frequency domain resources in frequency domain, the m resources correspond to m time elements in time domain, a first frequency domain resource used by a signal carried in an $i^{th}$ time element is distributed on at least two carrier components, the signal carried in the $i^{th}$ time element comprises a first signal, a frequency domain resource of the first signal is the first frequency domain resource, a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j.

2. The method according to claim 1, wherein the first frequency domain resource comprises k frequency domain resources, the k frequency domain resources separately belong to k bandwidth parts (BWPs), the k BWPs are distributed on the at least two carrier components, k is a positive integer, and k is greater than or equal to 2.

3. The method according to claim 1, wherein the first frequency domain resource comprises a first bandwidth part (BWP), and the first BWP is distributed on the at least two carrier components.

4. The method according to claim 2, wherein the method comprises: receiving first information, wherein the first information comprises at least one of the following information: indication information of the m frequency domain resources, indication information of the m time elements, indication information of the first frequency domain resource, indication information of the k frequency domain resources, indication information of the k BWPs, or configuration information of the m signals.

5. The method according to claim 1, wherein the first signal is generated based on indication information of the first frequency domain resource, and the indication information of the first frequency domain resource comprises at least one of the following: indication information of a first BWP, indication information of k BWPs, or a start frequency, a size, and a range that are of the first frequency domain resource.

6. The method according to claim 1, wherein the first signal comprises q parts, the q parts correspond to k frequency domain resources, and q is a positive integer.

7. A signal transmission method, comprising:
    receiving m signals, wherein m is a positive integer greater than or equal to 2, and
    the m signals are located on m resources, the m resources correspond to m frequency domain resources in frequency domain, the m resources correspond to m time elements in time domain,
    a first frequency domain resource used by a signal carried in an $i^{th}$ time element is distributed on at least two carrier components, wherein the signal carried in the $i^{th}$ time element comprises a first signal, and a frequency domain resource of the first signal is the first frequency domain resource,
    a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j.

8. The method according to claim 7, wherein the method comprises:
    estimating a phase based on a signal that is carried on a third frequency domain resource and that is received in the $i^{th}$ time element and a signal that is carried on the third frequency domain resource and that is received in the $j^{th}$ time element, wherein the third frequency domain resource comprises the overlapping part between the first frequency domain resource and the second frequency domain resource.

9. The method according to claim 7, wherein the first frequency domain resource comprises k frequency domain resources, the k frequency domain resources separately belong to k bandwidth parts (BWPs), the k BWPs are distributed on the at least two carrier components, k is a positive integer, and k is greater than or equal to 2.

10. The method according to claim 7, wherein the first frequency domain resource comprises a first bandwidth part (BWP), and the first BWP is distributed on the at least two carrier components.

11. The method according to claim 9, wherein the method comprises: sending first information, wherein the first information comprises at least one of the following information: indication information of the m frequency domain resources, indication information of the m time elements, indication information of the first frequency domain resource, indication information of the k frequency domain resources, indication information of the k BWPs, or configuration information of the m signals.

12. The method according to claim 7, wherein the first signal comprises q parts, the q parts correspond to k frequency domain resources, and q is a positive integer.

13. A non-transitory computer-readable storage medium, storing computer instructions that, when executed by a device, cause the device to perform:
    generating m signals, wherein m is a positive integer greater than or equal to 2; and
    sending the m signals on m resources, wherein
    the m resources correspond to m frequency domain resources in frequency domain, the m resources correspond to m time elements in time domain,
    a first frequency domain resource used by a signal carried in an $i^{th}$ time element is distributed on at least two carrier components, the signal carried in the $i^{th}$ time element comprises a first signal, a frequency domain resource of the first signal is the first frequency domain resource,
    a second frequency domain resource used by a signal carried in a $j^{th}$ time element is distributed on at least one carrier component, there is an overlapping part between the second frequency domain resource and the first frequency domain resource, i is greater than or equal to 1 and less than or equal to m, j is greater than or equal to 1 and less than or equal to m, i and j are positive integers, and i is not equal to j.

14. The non-transitory computer-readable storage medium according to claim 13, wherein the first frequency domain resource comprises k frequency domain resources, the k frequency domain resources separately belong to k bandwidth parts (BWPs), the k BWPs are distributed on the at least two carrier components, k is a positive integer, and k is greater than or equal to 2.

15. The non-transitory computer-readable storage medium according to claim 13, wherein the first frequency domain resource comprises a first bandwidth part (BWP), and the first BWP is distributed on the at least two carrier components.

16. The non-transitory computer-readable storage medium according to claim 14, wherein the instructions cause the device to perform: receiving first information, wherein the first information comprises at least one of the following information: indication information of the m frequency domain resources, indication information of the m time elements, indication information of the first frequency domain resource, indication information of the k frequency domain resources, indication information of the k BWPs, or configuration information of the m signals.

17. The non-transitory computer-readable storage medium according to claim 13, wherein the first signal comprises q parts, the q parts correspond to k frequency domain resources, and q is a positive integer.

* * * * *